(12) United States Patent
Lee et al.

(10) Patent No.: US 7,633,710 B2
(45) Date of Patent: Dec. 15, 2009

(54) MAGNETIC HEAD HAVING REDUCED INDUCTION COIL ELECTRICAL RESISTANCE AND METHOD FOR THE FABRICATION THEREOF

(75) Inventors: Edward Hin Pong Lee, San Jose, CA (US); Vladimir Nikitin, Campbell, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 354 days.

(21) Appl. No.: 11/477,724

(22) Filed: Jun. 28, 2006

(65) Prior Publication Data

US 2008/0002289 A1     Jan. 3, 2008

(51) Int. Cl.
*G11B 5/17* (2006.01)

(52) U.S. Cl. .............................. 360/123.17; 360/123.35; 360/123.56

(58) Field of Classification Search ............ 360/123.01, 360/123.06, 123.1, 123.11, 123.15, 123.17, 360/123.18, 123.19, 123.24, 123.35, 123.36, 360/123.38, 123.39, 123.4, 123.45, 123.56, 360/123.57
See application file for complete search history.

(56) References Cited

U.S. PATENT DOCUMENTS

| | | | |
|---|---|---|---|
| 4,760,481 A * | 7/1988 | Yuito et al. ............ | 360/123.35 |
| 5,065,270 A * | 11/1991 | Koyanagi et al. ....... | 360/123.56 |
| 6,369,983 B1 * | 4/2002 | Hong ..................... | 360/123.49 |
| 6,804,879 B2 | 10/2004 | Hsiao et al. | |
| 2002/0021528 A1 * | 2/2002 | Kamijima ............... | 360/123.38 |
| 2002/0181162 A1 | 12/2002 | Chen et al. | |
| 2003/0090834 A1 | 5/2003 | Kamarajugadda et al. | |
| 2004/0075938 A1 | 4/2004 | Hsiao et al. | |
| 2004/0080866 A1 * | 4/2004 | Hsiao et al. ............ | 360/123.54 |
| 2004/0177493 A1 | 9/2004 | Hsiao et al. | |
| 2004/0190196 A1 | 9/2004 | Hsiao et al. | |
| 2005/0024764 A1 | 2/2005 | Hsiao et al. | |

OTHER PUBLICATIONS

Tomohiro Okada et al., Fabrication Process for a Trapezoidal Main Pole for Single-Pole-Type Heads, IEEE Transactions on Magnetics, vol. 38, No. 5, Sep. 2002.

* cited by examiner

*Primary Examiner*—Craig A Renner
(74) *Attorney, Agent, or Firm*—Zilka-Kotab, PC

(57) ABSTRACT

A magnetic head including an induction coil having coil turns that are disposed between two magnetic poles of the magnetic head. The coil turns include a lower coil turn portion and an upper coil turn portion. In fabricating the induction coil, the lower coil turn portion is fabricated first, and the upper coil turn portion is fabricated directly upon the lower coil turn portion. The lower coil turn portion may be fabricated using damascene methods and the upper coil turn portion may be fabricated utilizing photolithographic methods. The lower coil turn portion and the upper coil turn portion of the induction coil turns are electrically connected, such that the thickness of the overall induction coil turns is increased. As a result, the electrical resistance of the coil turns is decreased, and heat generated in the coil is reduced.

20 Claims, 3 Drawing Sheets

MAGNETIC HEAD HAVING REDUCED INDUCTION COIL ELECTRICAL RESISTANCE AND METHOD FOR THE FABRICATION THEREOF

BACKGROUND OF THE INVENTION

1. Field of the Invention

The present invention relates generally to magnetic heads for hard disk drives, and more particularly to magnetic heads having a reduced induction coil electrical resistance and methods for the fabrication thereof.

2. Description of the Prior Art

It is a goal of the hard disk drive industry to develop magnetic heads that provide ever faster data writing speeds, such that increased quantities of data can be written onto the hard disk in shorter periods of time. Magnetic heads commonly include write heads having two magnetic pole members, generally referred to as the P1 pole and the P2 pole (which typically includes a P2 pole tip and a yoke portion), and a flat, spiral induction coil that is fabricated between the P1 and P2 poles. Write head electrical current that passes through the induction coil creates a magnetic flux in the two magnetic pole members, and the magnetic flux passes through the write head pole tip to create a magnetic field that writes magnetic data bits onto the media, such as a hard disk, that is disposed proximate the pole tip.

A problem that can arise in such magnetic heads is that the write current through the induction coil can create significant unwanted heating of the head. This results in unwanted expansion of head components, such as the magnetic poles, which causes the magnetic poles to protrude into the air bearing surface of the head. This can result in an unwanted reduction in the air bearing gap and even contact between the magnetic head and the disk surface.

SUMMARY OF THE INVENTION

The magnetic head of the present invention includes an induction coil having coil turns that are disposed between two magnetic poles of the magnetic head. The coil turns include a lower coil turn portion and an upper coil turn portion, where the upper coil turn portion is disposed directly upon the lower coil turn portion. In fabricating the induction coil, the lower coil turn portion is fabricated first. Thereafter, the second coil turn portion is fabricated upon the first coil turn portion. The lower coil turn portion may be fabricated using damascene methods and the upper coil turn portion may be fabricated utilizing photolithographic methods. The lower coil turn portion and the upper coil turn portion of the induction coil turns are electrically connected, such that the thickness of the overall induction coil turns is increased. As a result, the electrical resistance of the coil turns is decreased. When electrical current is passed through the induction coil, reduced heat is generated in the coil due to the reduced electrical resistance. As a result, the heating of components of the magnetic head, such as the magnetic poles, is reduced, and heat induced protrusion of the components at the air bearing surface of the magnetic head is reduced.

It is an advantage of the magnetic head of the present invention that heat induced protrusion at the ABS surface of the magnetic head is reduced.

It is another advantage of the magnetic head of the present invention that the electrical resistance of the induction coil of the write head element is reduced.

It is an advantage of the hard disk drive of the present invention that it includes a magnetic head in which heat induced protrusion at the ABS surface of the magnetic head is reduced.

It is another advantage of the disk drive of the present invention that it includes a magnetic head wherein the electrical resistance of the induction coil of the write head element is reduced.

The foregoing and other objects, features, and advantages of the present invention will be apparent from the following detailed description of the preferred embodiment which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
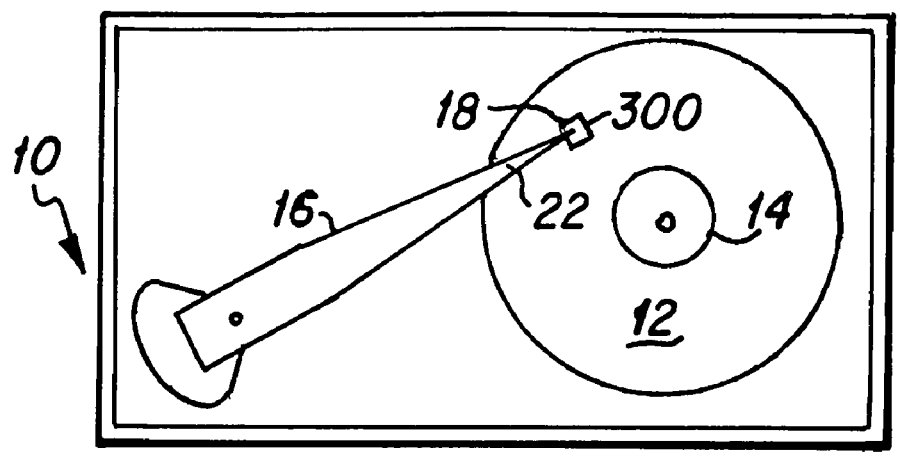
FIG. 1 is a simplified depiction of a hard disk drive of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 and a slider 18 that includes a magnetic head 300 of the present invention is disposed upon a distal end 22 of the actuator arm 16. A typical hard disk drive 10 may include a plurality of disks 12 that are rotatably mounted upon the spindle 14 and a plurality of actuator arms 16 each having a slider 18 with an included magnetic head 300 mounted upon the distal end 22 of each of the actuator arms. As is well known to those skilled in the art, when the hard disk drive 10 is operated, the hard disk 12 rotates upon the spindle 14 and the slider 18 acts as an air bearing that is adapted for flying above the surface of the rotating disk, such that an air bearing gap exists between the air bearing surface (ABS) of the slider and the surface of the disk 12. The slider 18 includes a substrate base upon which the various layers and structures that form the magnetic head are fabricated. Such sliders with included magnetic heads are fabricated in large quantities upon a wafer substrate that is subsequently sliced into discrete sliders 18 each including a magnetic head 300.

Figure 2:
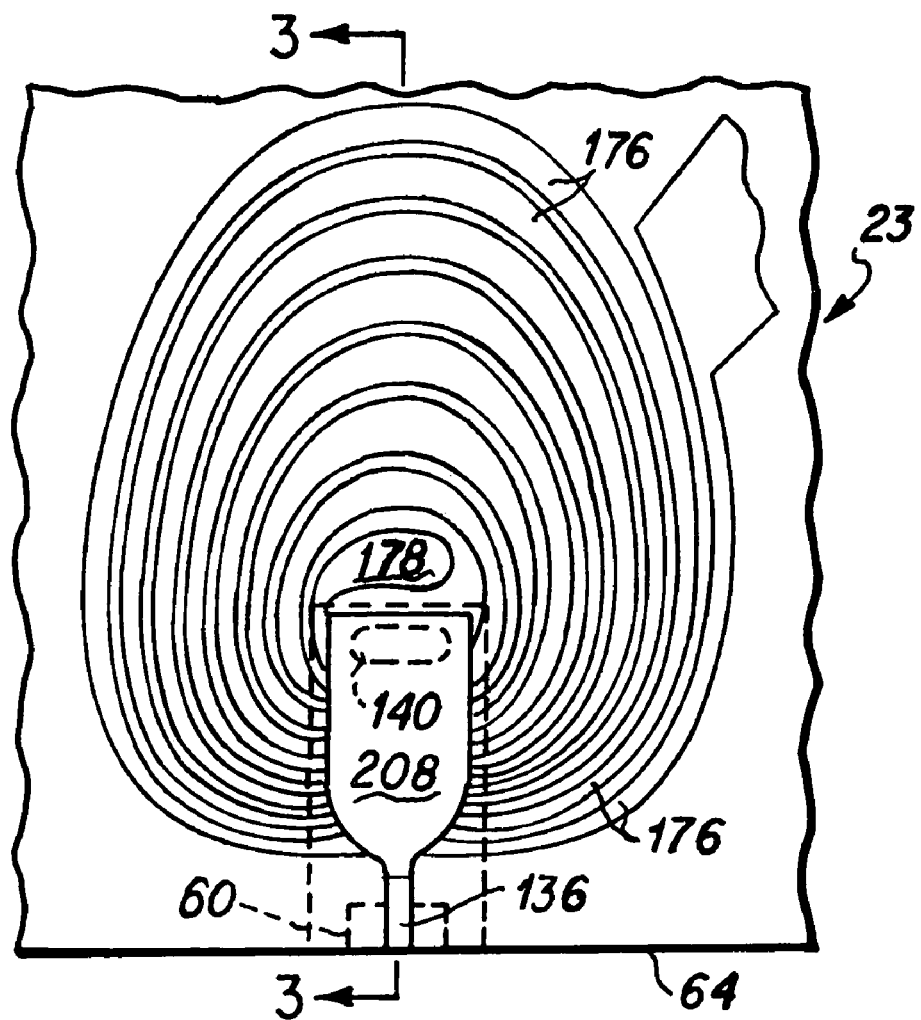
FIG. 2 is a top plan view with cut away portions depicting a typical prior art magnetic head and providing a view orientation that is utilized in the following figures and in describing the present invention.
Figure 3:
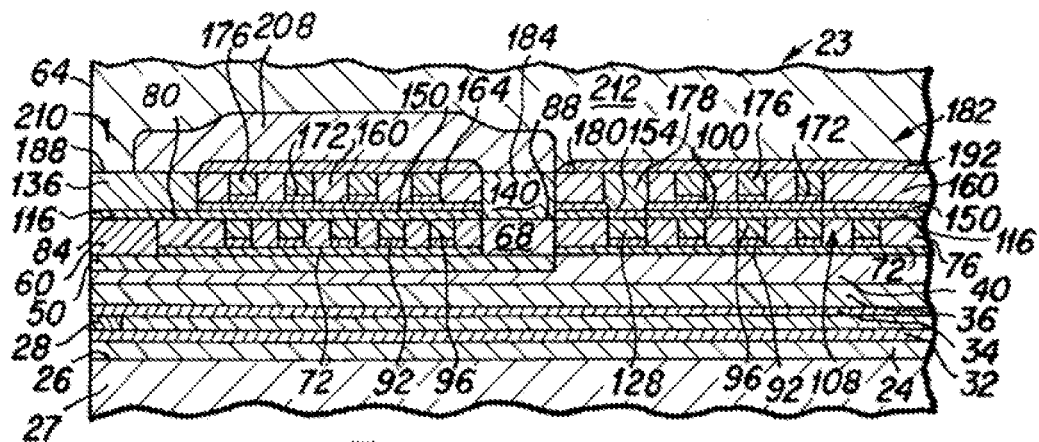
FIG. 3 is a side cross-sectional view taken along lines 3-3 of FIG. 2 of a prior art magnetic head.

FIG. 2 is a top plan view depicting significant portions of a typical prior art magnetic head 23, and FIG. 3 is a side cross-sectional view taken along lines 3-3 of FIG. 2. Referring to FIGS. 2 and 3, the prior art magnetic head 23 includes a first read head magnetic shield (S1) layer 24 that is fabricated upon the upper surface 26 of a wafer substrate 27, a read head element 28 that is fabricated between insulation layers 32 and 34 upon the S1 shield 24, and a second magnetic shield (S2) layer 36 that is fabricated upon the upper insulation layer 34. A further insulation layer 40 is deposited upon the S2 shield 36 and a first magnetic pole (P1) layer 50 is next fabricated upon the insulation layer 40. As is also well known to those skilled in the art, in a type of magnetic head termed a merged head, the P1 pole layer 50 and the S2 shield layer 36 are merged into a single layer that performs the functions of the S2 shield 36 when the head is reading data from a hard disk, and performs the function of the P1 magnetic pole layer when the magnetic head is writing data to a hard disk. The insulative layer 40 is not present in such a merged head. The present invention, as is discussed below in detail, may be fabricated as a standard magnetic head or as a merged magnetic head, (although it is depicted herein as a standard magnetic head) as will be clear to those skilled in the art upon reading further.

The next step in the fabrication of the prior art magnetic head 23 is the creation of a stepped P1 pole as is depicted in FIG. 3. The stepped P1 pole is created by fabricating an additional raised P1 pole segment or pedestal 60 in magnetic connection with the P1 pole layer 50 proximate the ABS surface 64 of the magnetic head 23. The pedestal 60 is generally fabricated centrally above the read head element 28. Additionally, a P1 pole back gap piece 68 is also fabricated in magnetic connection with the P1 pole layer 50. The P1 pole pedestal 60 and back gap piece 68 may be fabricated utilizing a patterned photoresist and electroplating techniques to plate the pedestal 60 and back gap piece 68 onto the P1 layer 50. Where photolithographic techniques are utilized, the pedestal 60 and back gap piece 68 may be fabricated from the same material as the P1 layer, such as Permalloy, or they may be preferably fabricated from another magnetic material, such as, but not limited to, NiFe 45/55 which has higher magnetic moment properties than Permalloy. The thickness of the pedestal 60 and the back gap piece 68 will generally determine the thickness of a first layer of induction coil members that are subsequently fabricated within the magnetic head 23, as are described herebelow. The first induction coil layer may be fabricated photolithographically or using damascene process techniques as are known in the prior art, and a damascene process is next described.

As depicted in FIG. 3, a thin film layer 72 is next deposited across the wafer surface. The thin film layer 72 is composed of a material, such as alumina, that will act as an electrical insulation layer and as an etch stop material in a subsequent reactive ion etch (RIE) etching process. Thereafter, a patterned electrical insulation layer 76 of a material such as hard baked photoresist is fabricated. The thickness of the layer 76 is generally at least as thick as the P1 pedestal 60 which will correspond to the desired thickness of the first layer of induction coil traces that are fabricated within the layer 76. An alumina fill layer (not shown) is then deposited across the surface of the wafer. A CMP step is next conducted to remove excess insulation material 76 as well as and the portion of the etch stop layer 72 that was deposited on top of the P1 pedestal 60 and back gap 68, such that a flat surface 80 is formed and the upper surfaces 84 and 88 of the P1 pedestal 60 and back gap 68 respectively are exposed. Thereafter, a thin etching mask layer (not shown) is fabricated upon the flat upper surface 80 with coil pattern openings in the mask layer for fabricating induction coil trenches into the insulation layer 76.

Utilizing an ion etch process which is typically a RIE process, induction coil trenches are etched through the openings in the mask and downward through the layer 76 to the etch stop layer 72. Therefore, the relationship of the materials which comprise the RIE mask, the etch stop layer 72 and the insulation layer 76 must be such that during the RIE step the material comprising the layer 76 is relatively easily etched, while the material comprising the RIE mask and the etch stop layer 72 is significantly more slowly etched. By way of example, where the etchable insulation material layer 76 is composed of an organic polymer such as a hard baked resist, a reactive ion etch process utilizing a gas such as oxygen can be utilized, and the RIE mask may be formed of materials such as TaO and $SiO_2$, and the etch stop layer 72 may consist of an electrical insulation material such as $Al_2O_3$.

Thereafter, an induction coil structure is fabricated in the typical manner. That is, a seed layer 92, which may consist of sublayers of Ta, NiFe or Cr, followed by copper is sputter deposited onto the wafer to form a good electrical interconnection and physical bonding at the bottom of the trenches. Induction coil turns 96 which are typically composed of copper, are next fabricated in an electroplating process to fill the induction coil trenches with copper. Alternatively, a chemical vapor deposition process may be used to deposit the copper. Thereafter, a chemical mechanical polishing step (CMP) is conducted to remove the excess copper and the RIE mask, such that a flat upper surface 100 is formed. It is preferable that the CMP polishing step be conducted to expose the upper surface 84 of the P1 pole piece 60, and the upper surface 88 of the back gap piece 68, such that good magnetic flux flow through the magnetic poles of the magnetic head will be achieved. It can now be seen that a first induction coil layer structure 108 has been fabricated within the insulation material layer 76.

As depicted in FIG. 3, a patterned write gap layer 116 is next fabricated upon the flat surface 100. The patterning of the write gap layer 116 provides an opening to expose the upper surface 88 of the back gap piece 68, and an opening to expose the upper surface of a central induction coil interconnect pad 128 for a subsequent electrical interconnection thereto, as is well known to those skilled in the art.

A magnetic P2 pole tip piece 136 is next formed upon the write gap layer 116, and a second back piece 140 is formed upon the surface 88 of the first back piece 68. Standard photolithographic process steps may be utilized to fabricate the P2 pole tip 136 and the second back piece 140, and a detailed description of the process steps is not necessary as they are well known to those skilled in the art. Basically, the steps include the deposition of a seed layer, followed by a photoresist layer that is subsequently patterned and the electroplating of the P2 pole tip 136 and second back piece 140 into the patterned photoresist layer, followed by the removal of the photoresist layer and seed layer. The P2 pole tip 136 is generally centrally disposed relative to the P1 pedestal 60 and in alignment with the read head element 28.

The second induction coil layer is next fabricated, preferably using the damascene method. Initially, a patterned second etch stop layer 150 is next fabricated upon the wafer surface. Where the write gap layer 116 is particularly thin, the etch stop layer 150 insures that etching through the write gap layer will not occur during the subsequent RIE etching step described below. The patterning of the second etch stop layer 150 includes the formation of an opening 154 for connection to the electrical interconnects 128 fabricated in the first coil layer 108. Thereafter, a second etchable insulation material layer 160 is fabricated upon the etch stop layer 150; the insulation layer 160 may be composed of a material such as hard baked photoresist. The thickness of the insulation layer 160 is generally thicker than the thickness of the P2 pole piece 136 and back gap piece 140, which determines the thickness of the second induction coil trenches that will be fabricated therein, as is described below. An alumina fill layer (not shown) is then deposited across the surface of the wafer. A CMP step is then conducted to remove excess second insulation layer as well as the portions of the second etch stop layer that were deposited on top of the P2 pole tip and the back gap, such that a flat surface 164 is formed, and the upper surfaces of the P2 pole tip 136 and back gap 140 are exposed.

A patterned second induction coil etching mask (not shown) is next fabricated upon the top surface 164 of the layer 160. The pattered mask includes openings for the fabrication of a second layer of induction coil trenches, and an opening for an electrical interconnect. The electrical interconnect opening is therefore fabricated in alignment with the electrical interconnect 128 of the first coil layer 108.

Utilizing an ion etch process which is preferably a reactive ion etch (RIE) process, induction coil trenches and an interconnect trench are etched through the second insulation layer 160. The etching of the induction coil trenches is halted by the etch stop layer 150, whereas the etching of the interconnect trench continues until the electrical interconnect 128 of the first coil layer 108 is reached. Therefore, the relationship of the materials which comprise the RIE mask and the second etch stop layer 150 and the second etchable insulation layer 160 must be such that during the RIE step, the material comprising the layer 160 is relatively easily etched, while the material comprising the RIE mask and the etch stop layer 150 is significantly more slowly etched. As described hereabove, where the second etchable insulation material layer 160 is composed of an organic polymer such as a hard baked resist, a reactive ion etch process utilizing a gas such as oxygen can be utilized, and the RIE mask may consist of TaO or $SiO_2$ and etch stop layer 150 may preferably consist of $Al_2O_3$.

Thereafter, a seed layer 172 is next deposited onto the substrate and into the coil trenches. As is known in the art, a typical seed layer 172 is preferably a sputter deposited dual layer composed of a Ta, NiFe or Cr initial sublayer part and a copper subsequent sublayer part. The upper induction coil layer turns 176 and upper interconnect 178 are then fabricated by electroplating induction coil material 176, such as copper, into the coil trenches, as is well known to those skilled in the art. The copper filling can also be achieved by chemical vapor deposition methods. Thereafter, a CMP process step is conducted to remove the excess copper and the RIE mask, such that a flat upper surface 180 is formed and the second induction coil layer structure 182 is completed. It is significant to note that the upper surface 184 of the back gap piece 140 and the upper surface 188 of the P2 pole tip 136 are exposed in this CMP process.

Next, as depicted in FIG. 3, a patterned insulation layer 192 is fabricated upon the upper surface 180 of the coil pattern with openings formed therein to provide for magnetic connection of a yoke member to the upper surface 188 of the P2 pole tip 136 and the upper surface 184 of the back gap piece 140 respectively. Thereafter, using well known photolithographic techniques, the yoke portion 208 of the second magnetic pole layer is then fabricated onto the device to magnetically connect the P2 pole tip 136 with the back piece 140. A gap or recess 210 is preferably formed between the yoke 208 and the air bearing surface 64 that will ultimately be formed, as is well understood by those skilled in the art. Finally, further fabrication steps as are known in the art are then utilized to produce the electrical lead connections and the magnetic head is then encapsulated with a material such as alumina 212, and further well known steps are taken, ultimately including slicing the wafer and polishing the heads at the ABS surface 64, to form the completed magnetic head 23.

In a typical embodiment, the P1 pole pedestal 60 and P2 pole tip 136 have thicknesses of approximately 2 microns, such that the thickness of the coil turns 96 and 176 is approximately 2 microns. The width of the coil turns can be from approximately 2 microns to as narrow as approximately 0.25 microns, and an insulation width between the coil turns of approximately 0.1 to 0.25 microns is sufficient to separate the coil turns.

A significant problem that can occur in the type of magnetic heads described hereabove is that electrical current that passes through the induction coil can create significant heat within the magnetic head. This heat can cause components of the magnetic head, such as the magnetic poles proximate the induction coil, to expand. This expansion can create unwanted and unpredictable protrusion of the magnetic poles and other head structures into the air bearing surface of the magnetic head. Where such air bearing surface protrusions exist, the fly height gap between the ABS of the magnetic head and the surface of the hard disk is altered, thereby causing the magnetic head to fly closer to the disk, and in extreme cases to contact and scratch the disk surface. This ultimately creates unpredictability in the magnetic head and disk drive performance characteristics. As is described below, the present invention seeks to reduce the protrusion problem by reducing the heat that is generated in the induction coil during the data writing process, and this is accomplished by reducing the electrical resistance of the induction coil. In the present invention the reduction in the electrical resistance of the coil is accomplished by adding additional induction coil material to the induction coil turns, thereby increasing the thickness of the coil turns and reducing their electrical resistance, which reduces the heat build up in the coil from the electrical current that flows through it.

Figure 4:
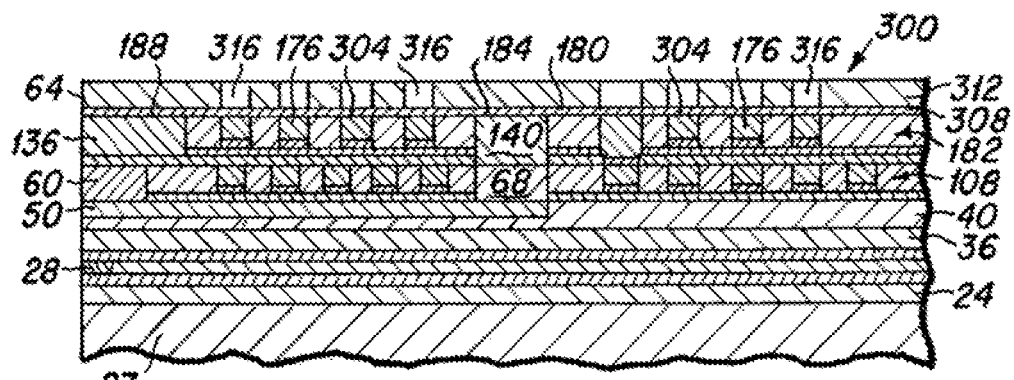
FIG. 4 is a side cross-sectional view of an initial fabrication step of the magnetic head of the present invention, which serves as a starting point for the detailed description thereof.

FIG. 4 is a side cross-sectional view of an initial fabrication step of the magnetic head 300 of the present invention. As can be seen in FIG. 4, the magnetic head has been fabricated with both the first and second induction coil layers 108 and 182 of the prior art magnetic head 23, and identical structures in FIGS. 3 and 4 have been given identical numbers for ease of understanding. Therefore, as depicted in FIG. 4, the magnetic head includes a completed second induction coil structure 182 including a CMP step to create a planarized surface 180 in which the upper surface 188 of the P2 pole tip 136, and the upper surface 184 of the second back gap piece 140, and the upper surface 304 of the induction coil turns 176 of the second induction coil layer 182 are exposed.

As depicted in FIG. 4, in a photolithographic fabrication process, a seed layer 308 is deposited upon the upper surface 180. The seed layer 308 preferably includes a first sublayer comprised of Ta, NiFe or Cr, and a second sublayer comprised of Cu. The sublayers are preferably sputter deposited onto the wafer to form a good electrical interconnection and physical bonding with the copper traces of the second induction coil layer. Thereafter, a layer of photoresist 312 is deposited and photolithographically patterned to create induction coil trenches 316 that are formed above the induction coil turns 176 of the second induction coil layer 182.

Figure 5:
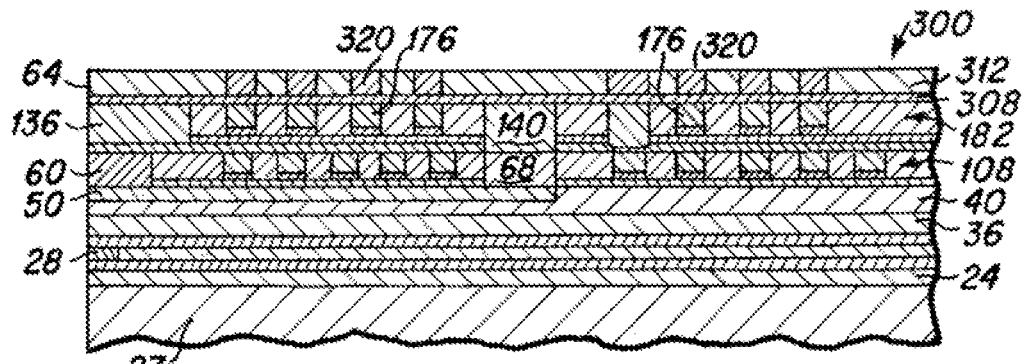
FIGS. 5-6 are views depicting further fabrication steps of the present invention.

As is next depicted in FIG. 5, an electroplating process step is conducted in which copper induction coil material is electroplated into the trenches 316 to create upper induction coil turns 320. The width of the upper induction coil turns 320 is preferably approximately equal to but may be somewhat less than the width of the lower induction coil turns 176. The thickness of the upper induction coil turns 320 may be approximately equal to the thickness of the lower coil turns 176, that is, approximately 2 microns.

Figure 6:
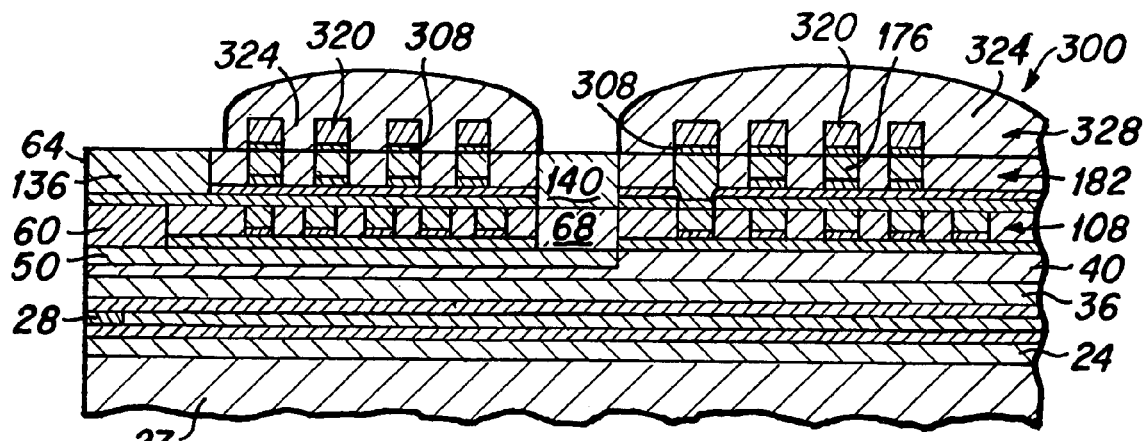

Thereafter, as depicted in FIG. 6, the photoresist 312 is removed, such as is typically done through the use of a wet chemical stripping process, and the seed layer 304 (if present) is thereafter removed, such as through the use of a sputter etching process. Thereafter, a patterned hard baked resist 324 is fabricated upon the upper coil turns 320 to electrically insulate the coil turns. The magnetic head 300 therefore includes a second induction coil layer 328 that includes the coil turns 176 plus the coil turns 320 that are fabricated thereon.

Figure 7:
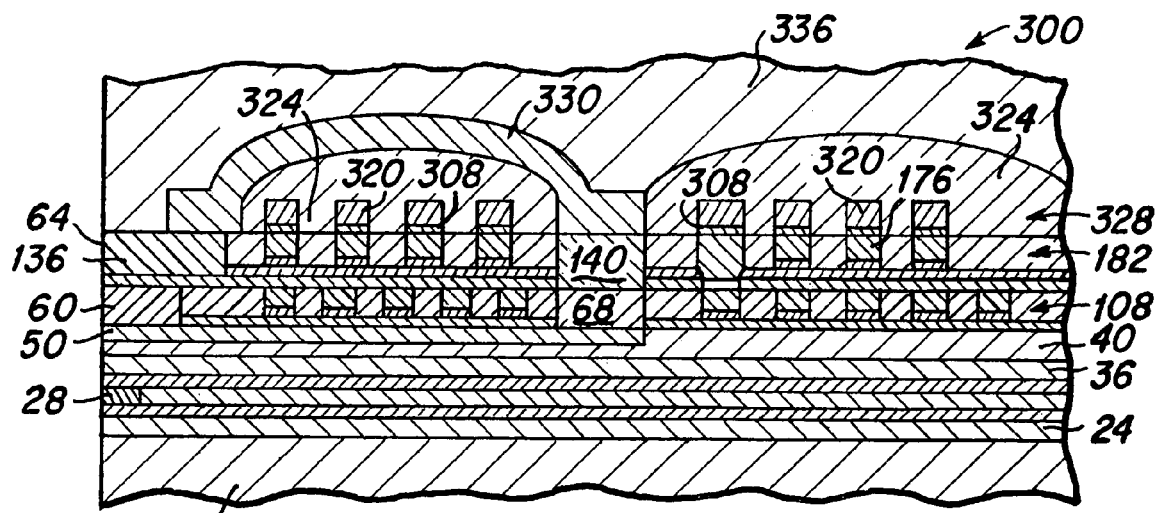
FIG. 7 is a side cross-sectional view of a magnetic head of the present invention.

Thereafter, as depicted in FIG. 7, standard photolithographic process steps are undertaken to fabricate a second magnetic pole yoke 330 (such as is depicted in FIG. 3 and described above) that completes the second magnetic pole of the magnetic head 300, such that magnetic flux can flow between the back gap piece 140, through the yoke 330 and to the P2 pole tip 136. Thereafter, following further well known processing steps, an encapsulating layer 336 of insulation material, such as alumina, is ultimately fabricated. This is followed by the slicing of the wafer, the fabrication of the ABS surface 64 and ultimately the completed fabrication of discrete magnetic heads 300.

A comparison of the magnetic head of the present invention as depicted in FIG. 7 with the prior art magnetic head depicted in FIG. 3 reveals that additional upper induction coil turns 320 have been added to the coil turns 176 of the second induction coil layer 328 in the magnetic head 300 of the present invention. The second induction coil layer 328 may therefore be thought of including lower coil turns 176 and upper coil turns 320, where the upper coil turns 320 are fabricated upon the lower coil turns 176 in electrical connection therewith. The upper coil turns 320 thereby combine with the lower coil turns 176 to create thicker overall induction coil turns that therefore have a reduced electrical resistance. In the preferred embodiment, the additional upper induction coil turns 320 are fabricated utilizing photolithographic techniques on top of the lower coil turns 176 that have been fabricated utilizing damascene fabrication techniques, as has been described hereabove. Due to the reduced electrical resistance of the second induction coil structure 328 heat build up within the magnetic head 300 that is caused by the passage of electrical current through the induction coil is reduced. As a result, there is reduced thermal expansion of the magnetic head structures, such as the magnetic poles, and this results in the reduction of unwanted thermally induced protrusion of magnetic head structures into the ABS of the magnetic head. This ultimately results in a more clearly defined and predictable fly height of the air bearing gap between the magnetic head and the surface of the hard disk of a hard disk drive and, as a result, the performance characteristics of the hard disk drive are improved.

While the present invention has been shown and described with regard to certain preferred embodiments, it is to be understood that those skilled in the art will no doubt devise certain alterations and modifications in form and detail hereof that nevertheless include the true spirit and scope of the invention. It is therefore intended that the following claims cover all such alterations and modifications hereof which nevertheless include the true spirit and scope of the invention.

What is claimed is:

1. A magnetic head, comprising:
   at least two magnetic poles;
   a first induction coil being disposed between said magnetic poles;
   a second induction coil being disposed between said magnetic poles; and
   an insulating layer between the first and second induction coils,
   said second induction coil including coil turns having a lower coil turn portion and an upper coil turn portion, where said upper coil turn portion is disposed directly upon said lower coil turn portion such that said second induction coil is thicker than said first induction coil.

2. A magnetic head as described in claim 1, wherein said lower coil turn portion includes a seed layer.

3. A magnetic head as described in claim 2 wherein said upper coil turn portion includes a seed layer that is disposed upon said lower coil turn portion.

4. A magnetic head as described in claim 1, wherein the insulating layer is a write gap layer.

5. A magnetic head as described in claim 1 wherein said lower coil turn portion is comprised of copper and said upper coil turn portion is comprised of copper.

6. A magnetic head, comprising:
   a substrate base;
   a first magnetic pole (P1) being disposed above said substrate base;
   a P1 pole pedestal being disposed upon said P1 pole;
   a first etch stop layer being disposed upon said P1 pole;
   a first electrical insulation layer being disposed upon said first etch stop layer;
   a first induction coil layer being disposed within said first electrical insulation layer;
   a write gap layer being disposed above said first induction coil layer;
   a second etch stop layer being disposed upon said write gap layer;
   a second electrical insulation layer being disposed upon said second etch stop layer;
   lower coil turns of a second induction coil layer being disposed within said second electrical insulation layer;
   a third insulation layer being disposed above said second insulation layer;
   upper coil turns of said second induction coil layer being disposed within said third insulation layer, said upper coil turns being disposed upon said lower coil turns and in electrical current flow communication therewith such that said second induction coil layer is thicker than said first induction coil layer.

7. A magnetic head as described in claim 6, wherein said lower coil turns include a seed layer.

8. A magnetic head as described in claim 6 wherein said upper coil turns include a seed layer.

9. A magnetic head as described in claim 6, wherein said second induction coil layer includes a first seed layer, said lower coil turns, a second seed layer that is disposed upon said lower coil turns and said upper coil turns that are disposed upon said second seed layer.

10. A magnetic head as described in claim 6, wherein said lower coil turns are fabricated utilizing a damascene method and said upper coil turns are fabricated utilizing a photolithographic method.

11. A magnetic head as described in claim 6 wherein said lower coil turns are comprised of copper and said upper coil turns are comprised of copper.

12. A hard disk drive comprising:
    a motor for rotating a spindle;
    a magnetic medium disk mounted on said spindle;
    an actuator assembly including a magnetic head for writing magnetic information on said disk, said magnetic head including:
    at least two magnetic poles;

a first induction coil being disposed between said magnetic poles;

a second induction coil being disposed between said magnetic poles; and an insulating layer between the first and second induction coils, said second induction coil including coil turns having a lower coil turn portion and an upper coil turn portion, where said upper coil turn portion is disposed directly upon said lower coil turn portion such that said second induction coil is thicker than said first induction coil.

13. A hard disk drive as described in claim 12, wherein said lower coil turn portion includes a seed layer.

14. A hard disk drive as described in claim 13 wherein said upper coil turn portion includes a seed layer that is disposed directly upon said lower coil turn portion.

15. A hard disk drive as described in claim 12, wherein the insulating layer is a write gap layer.

16. A hard disk drive as described in claim 12 wherein said lower coil turn portion is comprised of copper and said upper coil turn portion is comprised of copper.

17. A method for fabricating a magnetic head, comprising the steps of:

fabricating a first magnetic pole;

fabricating a first induction coil structure above said first magnetic pole;

fabricating an insulation layer above said first induction coil structure;

fabricating a second induction coil structure above said insulation layer including:

fabricating lower induction coil turns of said second induction coil structure upon said insulation layer;

fabricating upper induction coil turns of said second induction coil structure directly upon said lower induction coil turns such that said second induction coil structure is thicker than said first induction coil structure;

fabricating a second magnetic pole above said upper induction coil turns.

18. A method for fabricating a magnetic head as described in claim 17 wherein said upper induction coil turns include a seed layer, and wherein the steps of fabricating said upper induction coil turns includes:

depositing said seed layer upon said lower induction coil turns; and electroplating a remainder of said upper induction coil turns upon said seed layer.

19. A method for fabricating a magnetic head as described in claim 17, wherein said lower induction coil turns are fabricated utilizing a damascene method and said upper induction coil turns are fabricated utilizing a photolithographic method.

20. A method for fabricating a magnetic head as described in claim 17 wherein said lower induction coil turns are comprised of copper and said upper induction coil turns are comprised of copper.

* * * * *

UNITED STATES PATENT AND TRADEMARK OFFICE
CERTIFICATE OF CORRECTION

PATENT NO. : 7,633,710 B2  Page 1 of 1
APPLICATION NO. : 11/477724
DATED : December 15, 2009
INVENTOR(S) : Lee et al.

It is certified that error appears in the above-identified patent and that said Letters Patent is hereby corrected as shown below:

In the claims:
col. 10, line 14 replace "the" with --said--;

Signed and Sealed this

Sixteenth Day of February, 2010

David J. Kappos
*Director of the United States Patent and Trademark Office*